Patented Aug. 17, 1943

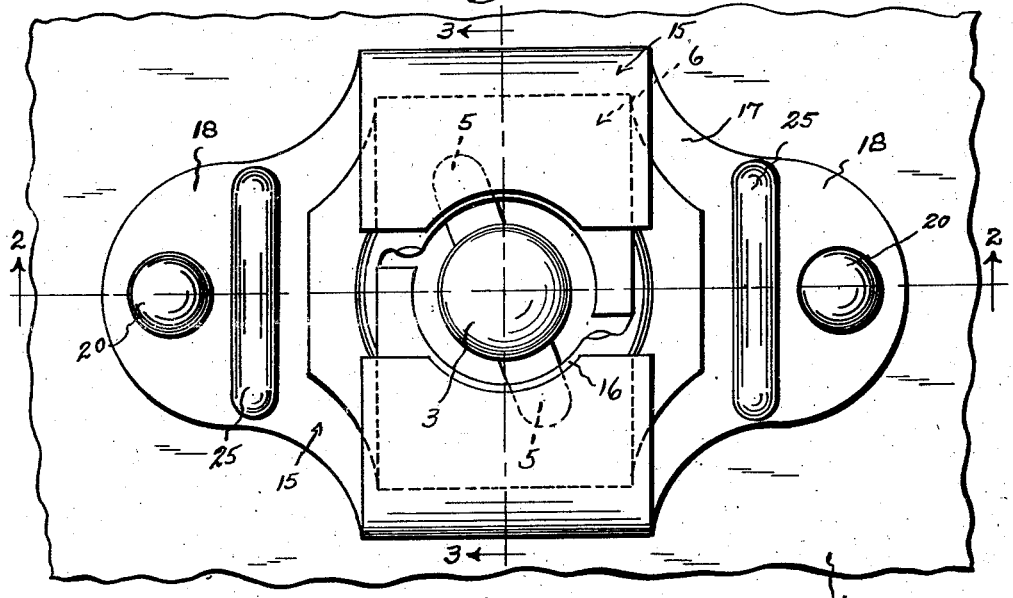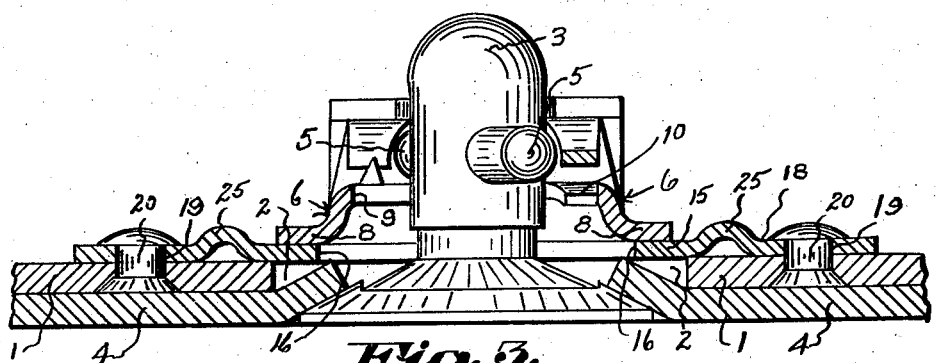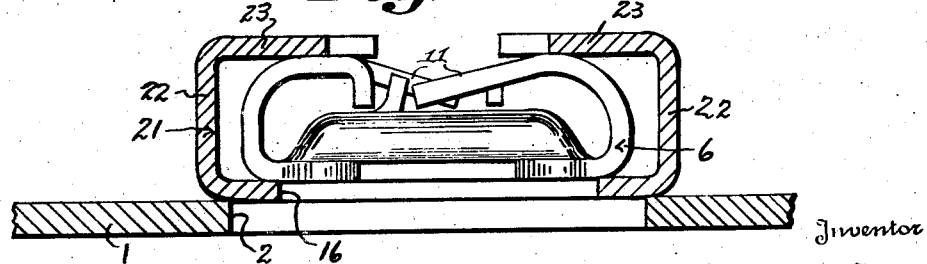

2,327,331

UNITED STATES PATENT OFFICE 2,327,331

SHIFTABLE ROTARY OPERATIVE FASTENER

Lloyd G. Pender, Detroit, Mich., assignor to United-Carr Fastener Corporation, Cambridge, Mass., a corporation of Massachusetts Application October 16, 1942, Serial No. 462,263

9 Claims. (Cl. 24—221)

The present invention relates to rotary stud fastener installations of the type employing a rotary stud member formed with a lateral projection, as for example, a radial pin, and mounted in a part to be secured to a support, which stud member is designed upon partial rotation thereof to interlock with a socket member attached to said support.

More particularly the invention relates to novel and improved means for shiftably attaching the socket member to the support and aims generally to improve existing attaching members for that purpose.

Further aims and objects of the invention will appear from the following description, reference being made to the accompanying drawing wherein a preferred embodiment of the invention is illustrated.

In the drawing:

Fig. 1 is a top plan view of a fastener-secured installation embodying the invention as viewed from the female fastener side thereof;

Fig. 2 is a sectional view of the fastener installation as taken on the line 2—2 of Fig. 1; and Fig. 3 is a transverse sectional view thereof as taken on the line 3—3 of Fig. 1.

Referring to the drawing, the invention is illustrated as applied to a conventional type of rotary stud fastener installation as commonly used for connecting together cowling and like sheets of aircraft bodies and embodying a support 1 formed with an aperture 2 for receiving the stud member 3 rotatably mounted in a part 4 to be attached to the support 1. The stud 3 conveniently is provided with radial arms or projections 5 adapted to engage and interlock with a cam or like seat of a female fastening member or socket device 6 attached to the support 1, upon turning movement of the stud, as will be readily understood.

The female fastener member or socket device may be of any of the approved forms of sheet metal devices commonly used as socket members for cowling fasteners. Preferably the member 6 is of the type shown in the co-pending application of William A. Bedford, Jr., Serial No. 420,554, filed November 26, 1941. Advantageously it is formed of a single piece of sheet metal having a base portion 8 providing a bearing section and a central stud-receiving aperture 9. Portions of the base surrounding the aperture 9 are dished outwardly providing a raised cam seat or embossment 10 adapted to be engaged by the radial arms 5 of the stud 3 when the latter is rotated a partial revolution. The female member or socket device may also be provided with integral locking means 11 overlying the cam seat 10 as disclosed in the said Bedford application above mentioned.

According to the invention the female or socket member 6 is loosely and shiftably attached to the support 1 by means of an attaching or retainer member in such a way as to permit lateral shifting of the member 6 relative to the support aperture 2 so as to effect ready alignment between the member 6 and the stud 3 of the part 4 to be attached to the support.

According to the invention, the attaching member comprises a plate member 15 having a base portion formed with an enlarged aperture which preferably is of substantially greater diameter than the apertured cam seat 10. The plate member advantageously includes a substantially rectangular central enlargement 17 surrounding the aperture 16 and may be formed with lateral extensions 18 apertured as at 19 to receive suitable fastening means 20 such as rivets for securing the attaching plate to the support. The opposite sides of the attaching member, intermediate the fastenings 20, are shaped to provide guide means 21 comprising upstanding portions 22 and laterally disposed portions 23 loosely overlying parts of the socket member 6. These guide means 21 being formed on opposite sides of the attaching member provide opposed channel-shaped guides for receiving the socket member and preferably the width and depth thereof exceeds the width and depth of the embraced portion of the socket member so that the socket member may be shiftable laterally, transversely and longitudinally of the attaching plate.

Suitable means may be provided for limiting the shiftability of the socket member longitudinally in the guide and advantageously such means may comprise stop members 25 conveniently formed as ridges in the plate 15 and spaced apart a distance substantially greater than the distance between adjacent edges of the socket member. In this way the socket member has limited longitudinal shiftability on the attaching member.

In practice the attaching plate and socket member are assembled together prior to securing the assembly to the support, which may be done by riveting or otherwise fastening the attaching plate on the support so that the aperture 16 thereof surrounds or is in substantial alignment with the aperture 2 of the support. The socket member is thus shiftable relative to the support aperture so that it may be readily aligned with the stud member 3 of the part 4 as the latter is assembled in place relative to the support 1. This construction facilitates materially the assembly of the parts of the fastener together regardless of accurate pre-location of the stud and socket members of the fastening.

Although I have illustrated and described a preferred embodiment of my invention, I do not wish to be limited thereby because the scope of my invention is best defined by the following claims.

I claim:

1. In a rotary operative fastener of the type comprising a rotary stud formed with a radially extending arm and a socket member formed with a base shiftably attached to an apertured support and adapted to interlock with the stud arm upon turning movement of the latter, of an attaching member comprising a plate secured to said support, said plate being formed with opposed channel-shaped guides loosely encompassing portions of said socket member.

2. In a rotary operative fastener of the type comprising a rotary stud formed with a radially extending arm and a socket member formed with a base shiftably attached to an apertured support and adapted to interlock with the stud arm upon turning movement of the latter, of an attaching member comprising a plate secured to said support, the sides of said plate intermediate the fastening attaching said plate to said support being channelled for shiftably receiving a portion of said socket members.

3. In a rotary operative fastener of the type comprising a rotary stud formed with a radially extending arm and a socket member formed with a base shiftably attached to an apertured support and adapted to interlock with the stud arm upon turning movement of the latter, of an attaching member comprising a plate secured to said support, the sides of said plate intermediate the fastening attaching said plate to said support being channelled and presenting opposed guides for shiftably receiving a portion of said socket member.

4. In a rotary operative fastener of the type comprising a rotary stud formed with a radially extending arm and a socket member formed with a base shiftably attached to an apertured support and adapted to interlock with the stud arm upon turning movement of the latter, of an attaching member comprising a plate secured to said support, and presenting opposed guides loosely embracing opposed portions of said socket member permitting lateral shifting of said socket base on said attaching plate.

5. In a rotary operative fastener of the type comprising a rotary stud formed with a radially extending arm and a socket member formed with a base shiftably attached to an apertured support and adapted to interlock with the stud arm upon turning movement of the latter, of an attaching member comprising an apertured plate secured to said support, and presenting opposed guides loosely embracing opposed portions of said socket member permitting lateral shifting of said socket base over the aperture of said attaching plate.

6. In a rotary operative fastener of the type comprising a rotary stud formed with a radially extending arm and a socket member formed with a base shiftably attached to an apertured support and adapted to interlock with the stud arm upon turning movement of the latter, of an attaching member comprising a plate secured to said support, the sides of said plate intermediate the fastenings attaching said plate to said support being channelled and presenting opposed guides for shiftably receiving a portion of said socket member, and means for limiting shifting movement of said socket member in a direction at right angles to said guides.

7. In a rotary operative fastener of the type comprising a rotary stud formed with a radially extending arm and a socket member formed with a base shiftably attached to an apertured support and adapted to interlock with the stud arm upon turning movement of the latter, of an attaching member comprising a plate secured to said support, the sides of said plate intermediate the fastenings attaching said plate to said support being channelled and presenting opposed guides for shiftably receiving a portion of said socket member, said plate being formed with spaced stop means for engaging sides of said base to limit shifting of the socket member in a direction at right angles to said guides.

8. In a rotary operative fastener of the type comprising a rotary stud formed with a radially extending arm and a socket member formed with a base shiftably attached to an apertured support and adapted to interlock with the stud arm upon turning movement of the latter, of an attaching member comprising a plate secured to said support, and presenting opposed guides loosely embracing opposed sides of said socket member.

9. In a rotary operative fastener of the type comprising a rotary stud formed with a radially extending arm and a socket member formed with a base shiftably attached to an apertured support and adapted to interlock with the stud arm upon turning movement of the latter, of an attaching member comprising an apertured plate secured to said support, and presenting opposed guides loosely embracing opposed portions of said socket member permitting lateral shifting of said socket base over the aperture of said attaching plate, said plate being formed with spaced stop means for engaging sides of said base to limit shifting of the socket member in a direction at right angles to said guides.

LLOYD G. PENDER.

DISCLAIMER 2,327,331.—*Lloyd G. Pender*, Detroit, Mich. SHIFTABLE ROTARY OPERATIVE FASTENER. Patent dated August 17, 1943. Disclaimer filed January 31, 1944, by the assignee, *United-Carr Fastener Corporation*.

Hereby enters this disclaimer to claims 4 and 5 in said specification.

[*Official Gazette February 22, 1944.*]